US005218750A

United States Patent [19]

Hannula et al.

[11] Patent Number: 5,218,750

[45] Date of Patent: Jun. 15, 1993

[54] METHOD OF MOUNTING A SPOOL MOUNT IN AN OPENING IN THE HULL OF A VESSEL

[75] Inventors: Scott A. Hannula, Virginia Beach; Billy T. Cox, Chesapeake; Ronald L. Saunders, Suffolk, all of Va.; Randy L. Thurman, Moyoch, N.C.

[73] Assignee: The United States of America as represented by the Secretary of the Navy, Washington, D.C.

[21] Appl. No.: 755,414

[22] Filed: Sep. 5, 1991

[51] Int. Cl.[5] .......... B23P 11/02

[52] U.S. Cl. .......... 29/451; 29/450

[58] Field of Search .......... 29/451, 453, 450, 235

[56] References Cited

U.S. PATENT DOCUMENTS

| | | | |
|---|---|---|---|
| 3,289,286 | 12/1966 | Belarger | 29/450 |
| 4,297,780 | 11/1981 | Temple | 29/451 |
| 4,584,755 | 4/1986 | Lundquist | 29/235 |
| 4,807,343 | 2/1989 | Wadsworth | 29/451 |
| 5,052,096 | 10/1991 | Fuller et al. | 29/451 |

FOREIGN PATENT DOCUMENTS

| | | | |
|---|---|---|---|
| 637231 | 12/1978 | U.S.S.R. | 29/451 |

*Primary Examiner*—Mark Rosenbaum
*Assistant Examiner*—David P. Bryant
*Attorney, Agent, or Firm*—Tamara L. Weber; Edward J. Connors, Jr.; William C. Townsend

[57] ABSTRACT

A method for replacing a spool mount or other noise reducing device which is located in a confined area. The tool for practicing the method includes both extraction elements and installation elements. The extraction elements include an extraction guide, an extraction stud, and an extraction rider. The installation elements include an extension guide, a compression guide, and an installation rider. The tool drastically reduces the time required for replacement of a spool mount and does not require any cutting or welding.

2 Claims, 5 Drawing Sheets

METHOD OF MOUNTING A SPOOL MOUNT IN AN OPENING IN THE HULL OF A VESSEL

FIELD OF THE INVENTION

This invention relates to tools, and more particularly to tools for replacing a spool mount or other noise reducing device which is located in a confined area.

BACKGROUND OF THE INVENTION

Spool mounts are frequently used to isolate noise or reduce vibrations in audio equipment, computers, and seafaring vessels. These mounts are spool-shaped devices made from rubber or any other material which can be used to absorb vibrational energy. Spool mounts deteriorate over time and must be replaced. However, they are frequently difficult to reach since they are embedded into the equipment. Spool mounts are commonly located on threaded support rods. These threaded support rods are used to isolate equipment from vibrations, such as the vibrations which occur in the hull of a seafaring vessel. The conventional method for replacing spool mounts requires cutting the threaded support rod, replacing the spool mount, and then welding the threaded support rod back together again. The subject invention dramatically reduces the time required for replacement of the spool mount and does not require any welding.

SUMMARY OF THE INVENTION

This spool mount replacement tool is particularly designed for removal of Portsmouth Unbounded Spool Type Mounts, but can be adapted for removal of a wide variety of spool mounts. The tool includes both extraction elements and installation elements. The extraction elements of the spool mount replacement tool include an extraction guide, an extraction stud, and an extraction rider. The first step in removal of the used spool mount requires fitting the extraction guide around the spool mount. A clamp is used to connect the two halves of the extraction guide. The extraction stud is a hollow cylinder with threads running the entire length of the interior surface and a small portion of the length of the exterior surface. This extraction stud is turned by the tool user such that the threaded interior surface of the extraction stud engages the threaded exterior surface of the threaded support rod. When the extraction stud has passed through the hollow interior section of the spool mount, the extraction rider is assembled. The extraction rider consists of two curved surfaces with interior threads. These curved surfaces are joined by screws. The threaded interior section of the extraction rider engages the threaded exterior surface of the emerging end of the extraction stud. The spool mount is removed by unthreading the extraction stud. The extraction guide is tapered such that it compresses the used spool mount as the extraction stud, extraction rider, and used spool mount move along the threaded support rod. This allows the used spool mount to be pulled out of the spool mount assembly without cutting the threaded support rod.

The installation elements of the spool mount replacement tool include an extension guide, a compression guide, and an installation rider. The extension guide is a hollow cylinder with threads running the entire length of the exterior surface and a small portion of the length of the interior surface. This extension guide is turned by the tool user such that the threaded portion of the interior surface of the extension guide engages the threaded exterior surface of the threaded support rod. Next, the replacement spool mount is inserted into the compression guide. The replacement spool mount and compression guide then slide over the extension guide. The installation rider is a hollow cylinder with interior threads. The interior threads of the installation rider engage the exterior threads of the extension guide and threaded support rod. The tapered section of the compression guide compresses the spool mount as the installation rider pushes the spool mount toward the opening in the hull. Then, a groove in the spool mount engages the opening of the hull as the spool mount is pushed out of the compression guide by the installation rider. After the replacement spool mount is installed, the installation rider and the extension guide are unthreaded and all of the installation elements are removed.

The extraction stud, extraction guide, extraction rider, extension guide, compression guide, and installation rider are made of corrosion resistant materials such as corrosion resistant steel.

BRIEF DESCRIPTION OF THE DRAWINGS

The invention will be best understood by referring to the accompanying drawings, wherein.

DETAILED DESCRIPTION

Figure 1:
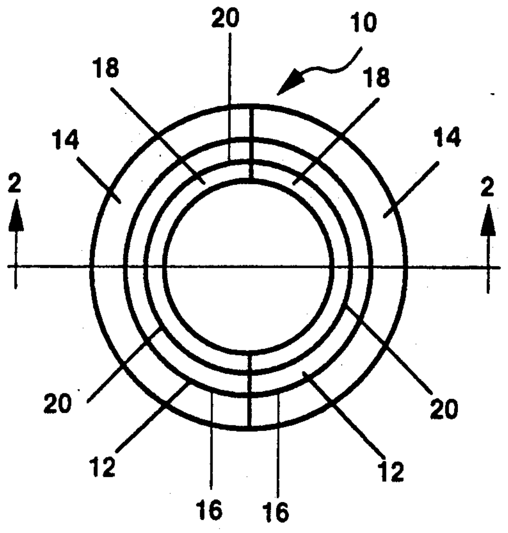
FIG. 1 is a plan view of an extraction guide.
Figure 2:
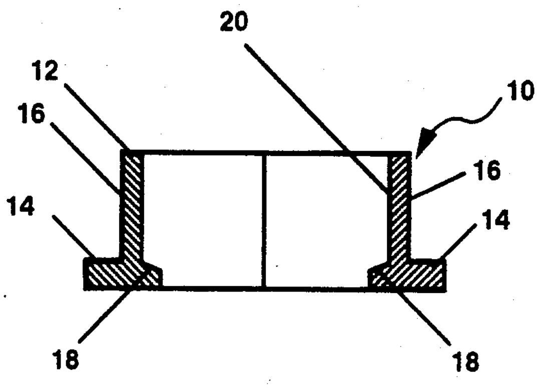
FIG. 2 is cross section view of an extraction guide, taken along line 2—2 of FIG. 1.

FIG. 1 and FIG. 2 illustrate an extraction stud, designated generally by the numeral 10. This extraction guide 10 is constructed of two semicircular walls 12. Each semicircular wall 12 has a flange 14 on the exterior surface 16 and a tapered section 18 on the interior surface 20.

Figure 3:
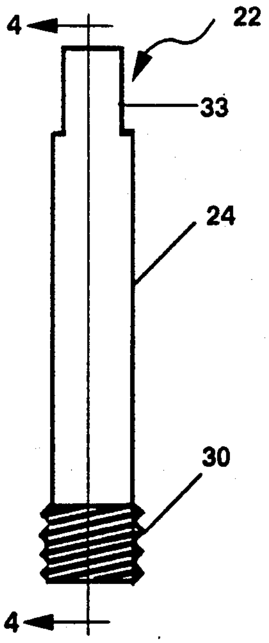
FIG. 3 is a side elevation view of an extraction stud.
Figure 4:
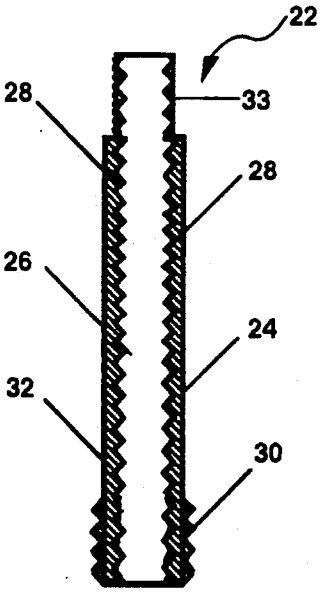
FIG. 4 is a cross section view of an extraction stud, taken on line 4—4 of FIG. 3.

FIG. 3 and FIG. 4 illustrate an extraction stud, designated generally by the numeral 22, comprising a cylinder 24 with a hollow interior section 26. Interior threads 28 run in a right-handed direction along the entire length of the hollow interior section 26. Exterior threads 30 run in a left-handed direction along a portion of the exterior surface 32 of the cylinder 24. The exterior surface 32 may have a flattened section 33 to permit turning with a wrench.

Figure 5:
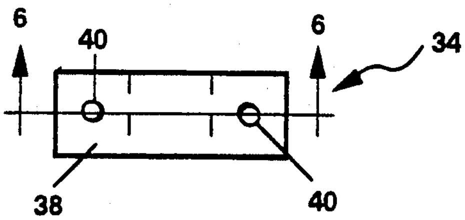
FIG. 5 is a side elevation view of an extraction rider.
Figure 6:
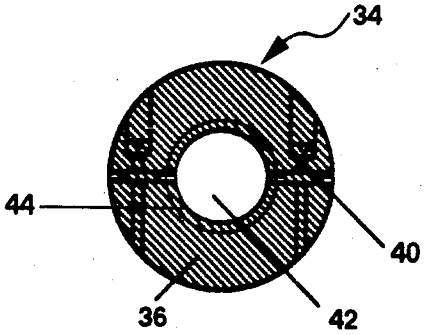
FIG. 6 is a cross section view of an extraction rider, taken along line 6—6 of FIG. 5.

FIG. 5 and FIG. 6 illustrate an extraction rider designated generally by the numeral 34. Primary metal piece 36 is connected to secondary metal piece 38 by screws 40. An interior section 42 is formed by the joining of the primary metal piece 36 and the secondary metal piece 38. The interior section 42 has a left-handed thread 44.

Figure 7:
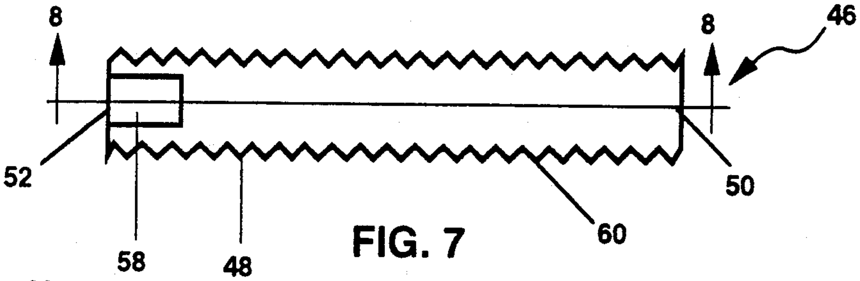
FIG. 7 is a side elevation view of an extension guide.
Figure 8:
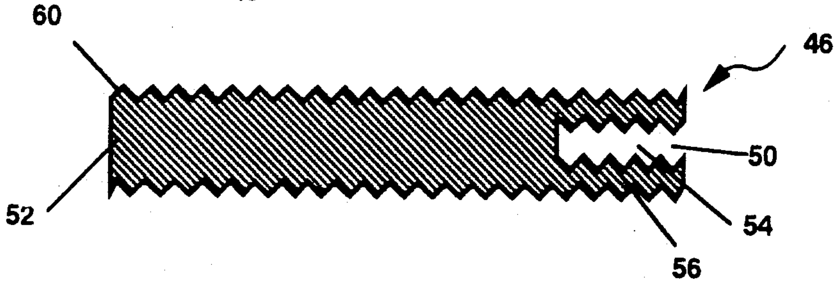
FIG. 8 is a cross section view of an extension guide, taken along line 8—8 of FIG. 7.

FIG. 7 and FIG. 8 illustrate an extension guide designated generally by the numeral 46. This extension guide 46 is a cylinder 48 with an first end 50, a second end 52, and a hollow interior section 54 near the first end 50. Interior threads 56 run in a right-handed direction along the hollow interior section 54. The exterior surface 58 near the second end 52 is flattened to permit turning with a wrench. Exterior threads 60 run in a right-handed direction along the entire length of the exterior surface 58 of the cylinder 48.

Figure 9:
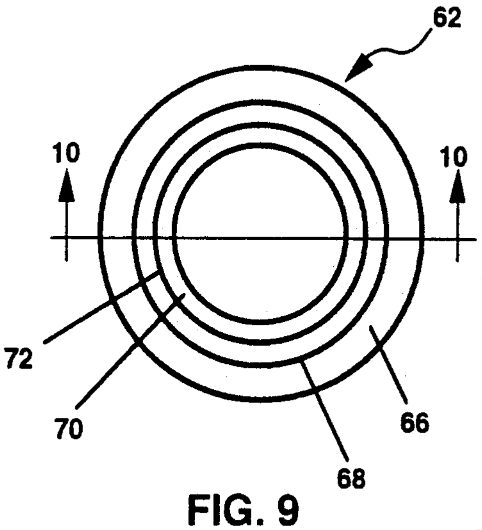
FIG. 9 is a plan view of a compression guide.
Figure 10:
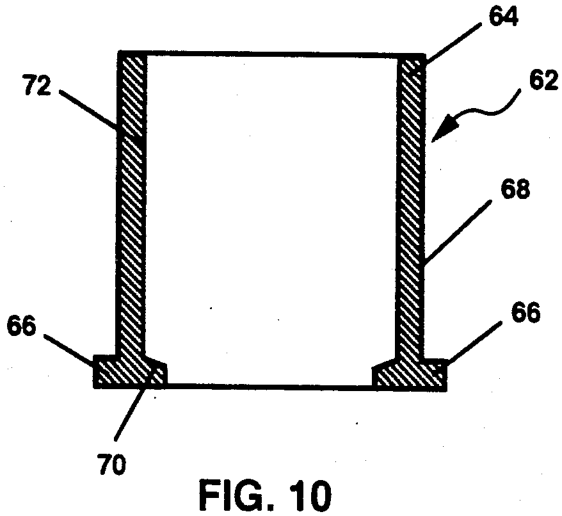
FIG. 10 is a cross section view of a compression guide, taken along line 10—10 of FIG. 9.

FIG. 9 and FIG. 10 illustrate a compression guide, designated generally by the numeral 62, constructed from a cylinder 64 with a flange 66 on the exterior surface 68 and a tapered section 70 on the interior surface 72.

Figure 11:
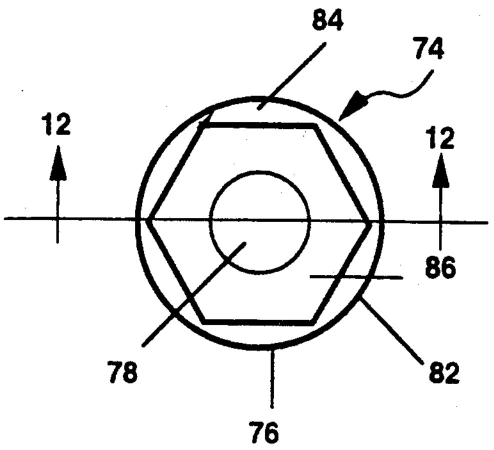
FIG. 11 is a plan view of an installation rider.
Figure 12:
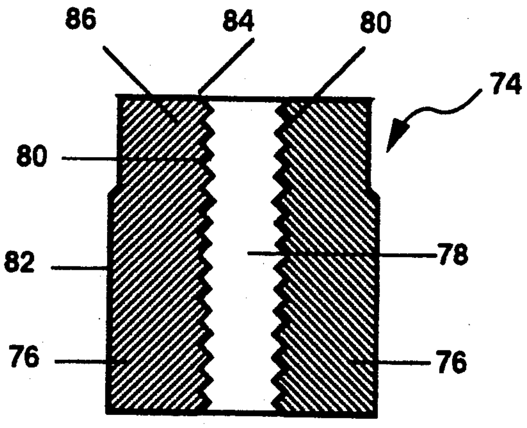
FIG. 12 is a cross section view of an installation rider, taken along line 12—12 of FIG. 11.

FIG. 11 and FIG. 12 illustrate an installation rider designated generally by the numeral 74. The installation rider 74 is a cylinder 76 with a hollow interior section 78. Threads 80 run in a right-handed direction along the entire length of the hollow interior section 78. The exterior surface 82 at the top end 84 of the cylinder 76 is cut to form a hexagonal nut 86.

Figure 13:
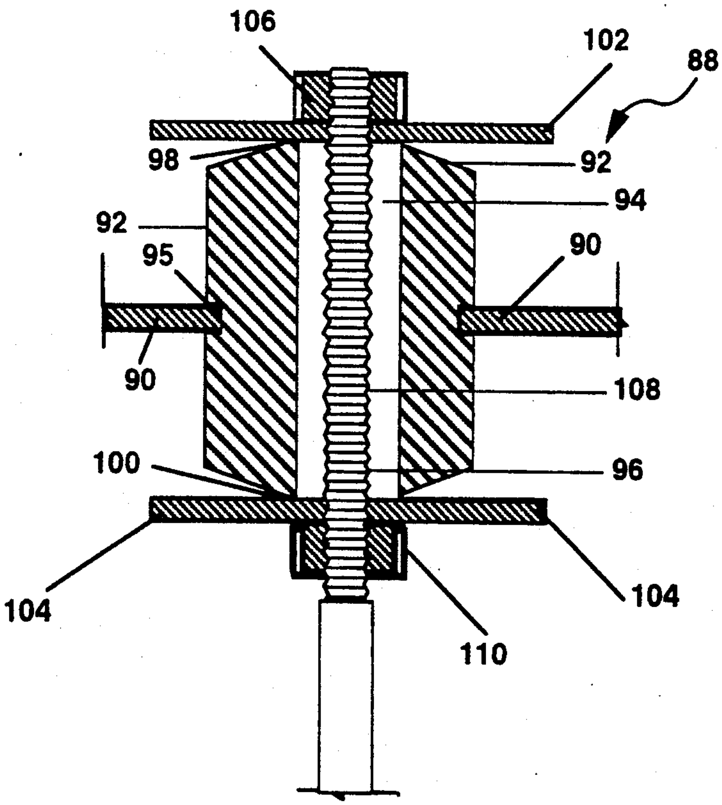
FIG. 13 is a fragmentary axial section through the threaded support rod showing a spool mount assembly.

FIG. 13 illustrates a spool mount assembly 88 as it is used to suppress noise in the hull 90 of a seafaring vessel. The spool mount 92 is a rubber device with a hollow interior section 94 and an exterior groove 95. A threaded support rod 96 extends through the hollow interior section 94 of the spool mount 92. The exterior groove 95 of the spool mount 92 engages an opening in the hull 90. The threaded support rod 96 serves to support equipment that should be isolated from vibrations in the hull 90. This threaded support rod 96 extends beyond both the first end 98 of the spool mount 92 and the second end 100 of the spool mount 92. A first washer 102 is adjacent to the first end 98 of the spool mount 92. A second washer 104 is adjacent to the second end 100 of the spool mount 92. A first washer nut 106 engages the exterior threads 108 of the threaded support rod 96 to hold the first washer 102 next to the first end 98 of the spool mount 92. A second washer nut 110 engages the exterior threads 108 of the threaded support rod 96 to hold the second washer 104 next to the second end 100 of the spool mount 92. The first washer 102, second washer 104, first washer nut 106, and second washer nut 110 retain the spool mount 92 in its proper position along the threaded support rod 96.

Preliminary steps for the process of extraction of a spool mount 92 begin with cleaning the threaded support rod 96 where it extends beyond the first washer nut 106 and second washer nut 110 with a wire brush or any other instrument suitable for cleaning a metal rod. Then, the first washer nut 106 and first washer 102 are removed. The second washer nut 110 and second washer 104 are threaded along the threaded support rod 96 as far as possible away from the second end 100 of the spool mount 92. The distance that the second washer nut 110 and second washer 104 can be moved away from the second end 100 of the spool mount 92 is limited by the length of the portion of threaded support rod 96 which is covered by exterior threads 108. The spool mount 92 may be lubricated to facilitate its removal.

Figure 14:
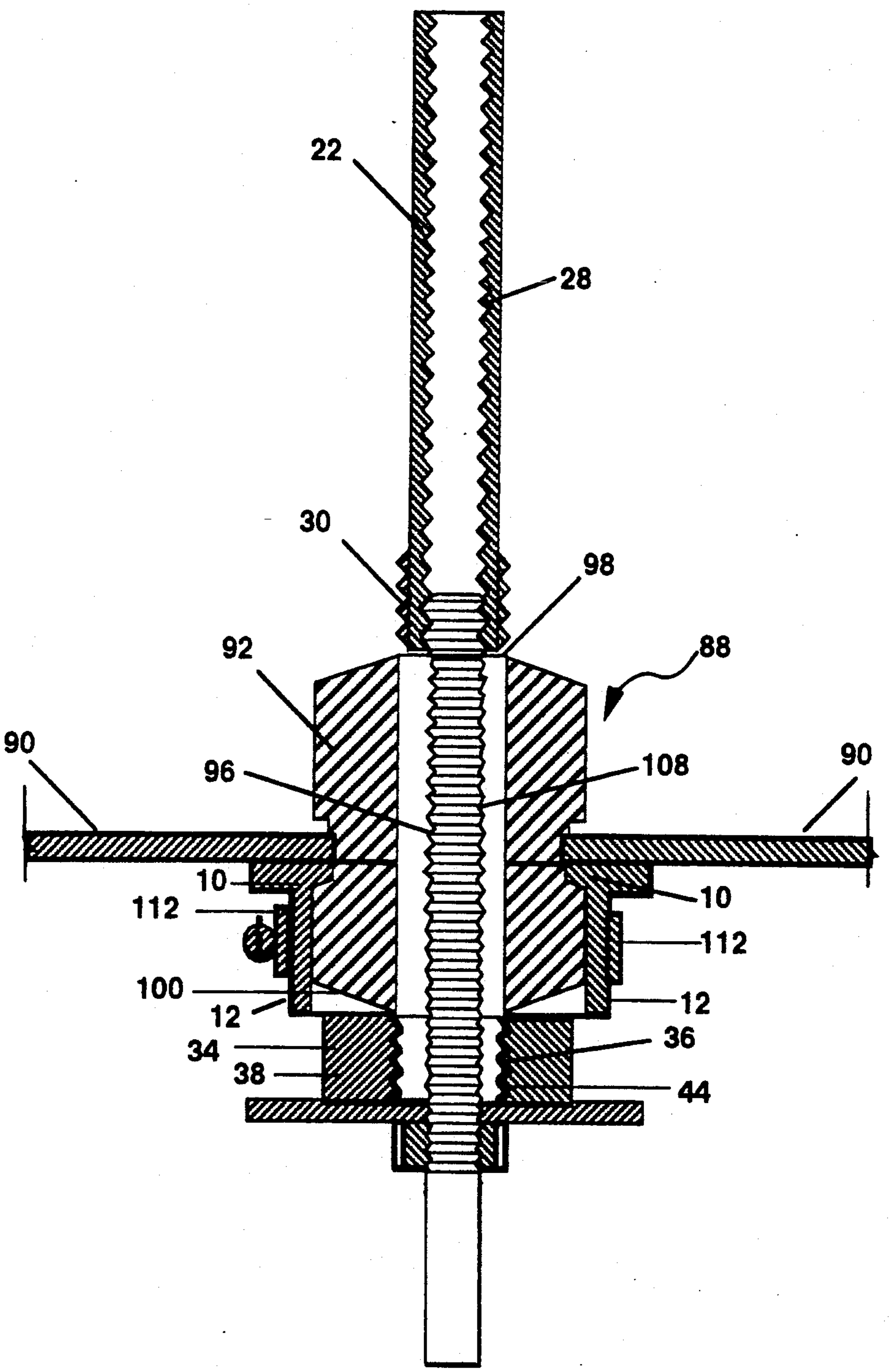
FIG. 14 is a fragmentary axial section through the threaded support rod showing extraction of a spool mount.

FIG. 14 illustrates extraction of a spool mount 92. After completion of the preliminary steps listed in the immediately preceding paragraph, the extraction guide 10, extraction stud 22, and extraction rider 34 are installed on the spool mount assembly 88. First, the two semicircular walls 12 of the extraction guide 10 are connected around the second end 100 of the spool mount 92 by a clamp 112. The interior threads 28 of the extraction stud 22 engage the exterior threads 108 of the threaded support rod 96 near the first end 98 of the spool mount 92. Threading the extraction stud 22 continues until the exterior threads 30 appear at the second end 100 of the spool mount 92. Primary metal piece 36 is attached to secondary metal piece 38 of the extraction rider 34 around the second end 100 of the spool mount 92. The left-handed thread 44 of the extraction rider 34 then engage the exterior threads 30 of the extraction stud 22. The spool mount 92 is removed by unthreading the extraction stud 22. As the extraction stud 22 and extraction rider 34 pull the spool mount 92, the extraction guide 10 continues to compress the spool mount 92. This causes the second end 100 of the spool mount 92 to pop out through the opening in the hull 90. Then, the extraction guide 10, the extraction stud 22, and extraction rider 34 are removed.

Figure 15:
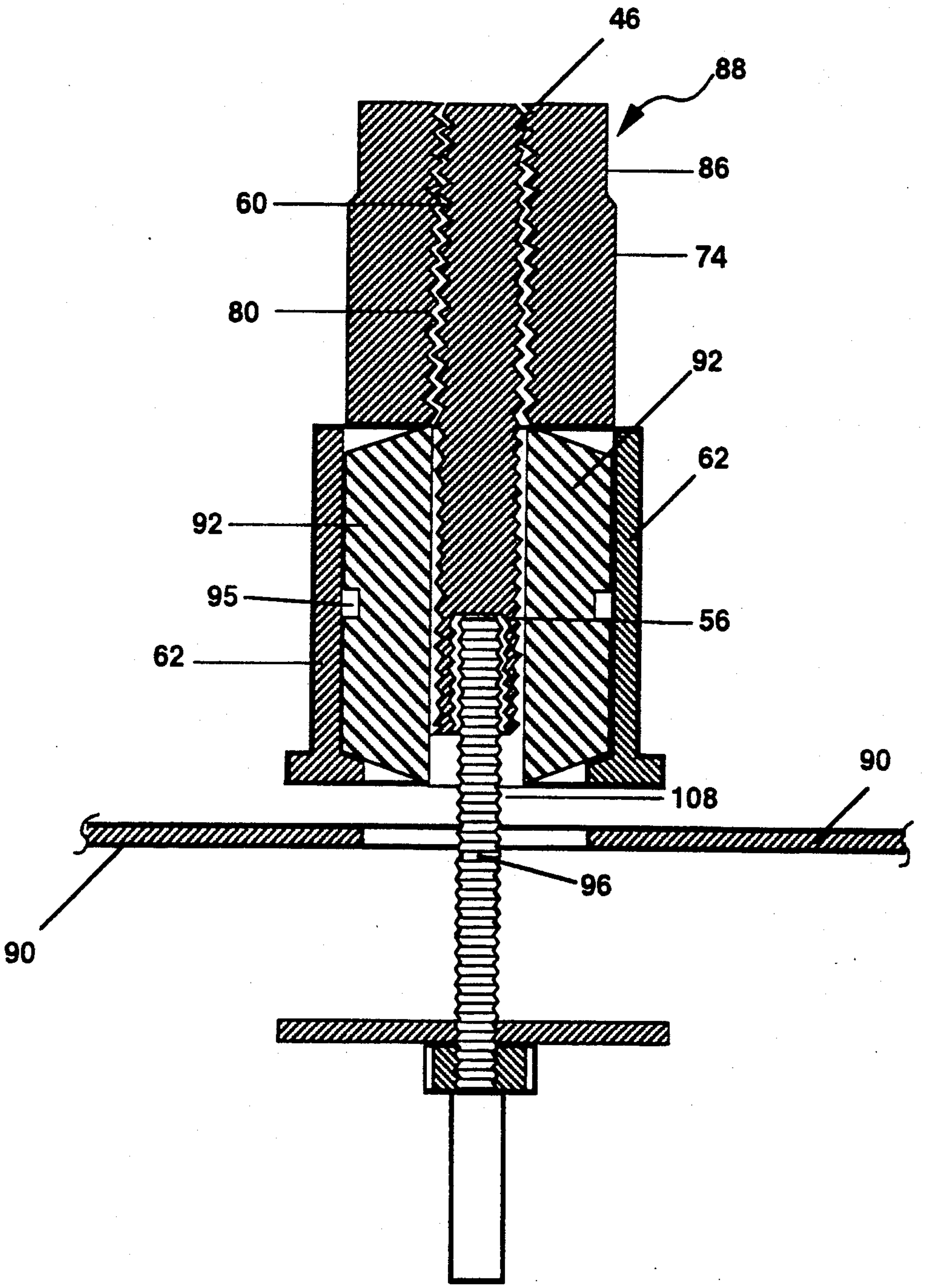
FIG. 15 is a fragmentary axial section through the threaded support rod showing the spool mount assembly as it is prepared for installation of a new spool mount.

FIG. 15 shows the spool mount assembly 88 prepared for installation of a spool mount 92. First, the interior threads 56 of the extension guide 46 engage the exterior threads 108 of the threaded support rod 96. The spool mount 92 is lubricated and fully inserted into the compression guide 62. The compression guide 62 and spool mount 92 then slides over the extension guide 46. Next, the interior threads 80 of the installation rider 74 engage the exterior threads 60 of the extension guide 46. A wrench is used to tighten the hexagonal nut 86 of the installation rider 74. When the installation rider 74 engages the spool mount 92, the alignment of the spool mount 92 and the threaded support rod 96 are checked. As can be seen from FIG. 15, it is important that the axis of the spool mount 92 be aligned with the axis of the threaded support rod 96 so that the spool mount 92 can be pushed into a position coaxial with the threaded support rod 96. It is important to minimize misalignment between the axis of the spool mount 92 and the axis of the threaded support rod 96 in order to avoid cutting the spool mount 92 with the hull 90 of the vessel. Any conventional method for approximating axial alignment may be used. For instance, a ruler placed against the bottom of the compression guide 62 can be used to estimate misalignment. Since the spool mount 92 fits tightly within the compression guide 62, the axis of the compression guide 62 can be assumed to be the axis of the spool mount 92. No more than ⅛" distance between the center of the compression guide 62 and the center of the threaded support rod 96 as measured at the bottom of the compression guide 62 is permissible. If more than ⅛" misalignment occurs, the spool mount 92, compression guide 62, and installation rider 74 should be removed and reinstalled. If there is no more than ⅛" misalignment, the tool operator should continue to turn the hexagonal nut 86 of the installation rider 74. The spool mount 92 is pushed along the threaded support rod 96 by the installation rider 74 as the installation rider 74 threads along the extension guide 46. The spool mount 92 will pop into place when the exterior groove 95 of the spool mount 92 engages the opening in the hull 90. Then, the installation rider 74 is unthreaded. The compression guide 62 slides off of the threaded support rod 96. The extension guide 46 is unthreaded from the threaded support rod 96.

After the spool mount 92 is installed, the spool mount assembly 88 is returned to its original condition as shown in FIG. 13. The first washer 102 and first washer nut 106 are replaced adjacent the first end 98 of the spool mount 92. The first washer nut 106 is tightened. The second washer 104 and second washer nut 110 are replaced adjacent the second end 100 of the spool mount 92. The second washer nut 110 is tightened.

This invention has been described in detail with particular reference to certain preferred embodiments thereof, but it should be understood that variations and modifications can be effected within the spirit and scope of the invention.

What is claimed is:

1. A method for installing a spool mount within an opening in the hull of a vessel, coaxially around a threaded support rod located in said opening, comprising the steps of:

providing an extension guide comprising a body with a threaded exterior surface, wherein said body has a hollow section, and interior threads located on the interior surface of said hollow section of said body, threading the interior threads of said extension guide to said threaded support rod, providing a compression guide comprising a hollow body with a tapered section on the interior surface, inserting said spool mount into said compression guide, sliding said compression guide over said extension guide, providing an installation rider comprising a hollow body with interior threads disposed along the interior surface of said hollow body, threading said installation rider on the threaded exterior surface of said extension guide, whereby said installation rider pushes said spool mount out of said compression guide, and whereby said spool mount is installed within said opening coaxially around said threaded support rod.

2. A method for installing a spool mount within an opening in the hull of a vessel, coaxially around a threaded support rod located in said opening, comprising the steps of:

providing an extension guide comprising a cylinder with a threaded exterior surface, wherein said cylinder has a hollow section, and interior threads located on the interior surface of said hollow section of said cylinder, threading said interior threads of said extension guide to said threaded support rod, providing a compression guide comprising a hollow cylinder with a tapered section on the interior surface, inserting said spool mount into said compression guide, sliding said compression guide around said extension guide, providing an installation rider comprising a hollow cylinder with interior threads disposed along the interior surface of said hollow cylinder and flattened sections forming a nut on the exterior surface of said hollow cylinder, threading said installation rider on the threaded exterior surface of said extension guide, engaging a wrench on said flattened sections forming a nut on the exterior surface of said installation rider, and turning said wrench, whereby said installation rider pushes said spool mount out of said compression guide, whereby said spool mounted is installed within said opening, coaxially around said threaded support rod.

* * * * *